US012751550B2

(12) United States Patent
Ang et al.

(10) Patent No.: US 12,751,550 B2
(45) Date of Patent: Oct. 6, 2026

(54) CHAIR COVER

(71) Applicant: SECRETLAB SG PTE. LTD., Singapore (SG)

(72) Inventors: Xiao Jia Ang, Singapore (SG); Ee Hao Gabriel Lim, Singapore (SG); Vincent Sin, Singapore (SG)

(73) Assignee: SECRETLAB SG PTE. LTD., Singapore (SG)

( * ) Notice: Subject to any disclaimer, the term of this patent is extended or adjusted under 35 U.S.C. 154(b) by 195 days.

(21) Appl. No.: 18/571,300

(22) PCT Filed: Jun. 17, 2022

(86) PCT No.: PCT/SG2022/050423
§ 371 (c)(1),
(2) Date: Dec. 18, 2023

(87) PCT Pub. No.: WO2022/265582
PCT Pub. Date: Dec. 22, 2022

(65) Prior Publication Data

US 2024/0277151 A1 Aug. 22, 2024

(30) Foreign Application Priority Data

Jun. 18, 2021 (SG) ............................ 10202106602T

(51) Int. Cl.
*A47C 7/24* (2006.01)
*A47C 31/00* (2006.01)
(Continued)

(52) U.S. Cl.
CPC ................ *A47C 7/24* (2013.01); *A47C 31/11* (2013.01); *B68G 7/052* (2013.01); *A47C 7/46* (2013.01)

(58) Field of Classification Search
CPC ................................. A47C 31/11; A47C 7/24
(Continued)

(56) References Cited

U.S. PATENT DOCUMENTS 2,667,211 A 1/1954 Krasnov et al.
4,232,898 A 11/1980 Bodrero
(Continued)

FOREIGN PATENT DOCUMENTS

CN 101992716 A 3/2011
CN 202345456 U 7/2012
(Continued)

OTHER PUBLICATIONS

International Search Report issued for the corresponding PCT patent application No. PCT/SG2022/050423, dated Jan. 26, 2023, 4 pages (For informational purposes only).
(Continued)

*Primary Examiner* — Rodney B White
(74) *Attorney, Agent, or Firm* — VIERING, JENTSCHURA & PARTNER mbB

(57) ABSTRACT

Various embodiments relates to a chair cover for covering at least a part of a chair, the chair cover comprising: at least one first panel formed of or from a first fabric, and configured to cover at least one middle section having a centreline of the at least the part of the chair; and a plurality of second panels formed of or from a second fabric different from the first fabric and joined together with the at least one first panel, wherein the plurality of second panels are configured to cover edges of the at least the part of the chair surrounding the at least one middle section, and wherein the plurality of second panels are configured to be stretched more than the at least one first panel such that the chair cover fits snugly around the edges of the at least the part of the chair.

19 Claims, 8 Drawing Sheets

(51) Int. Cl.
*A47C 31/11* (2006.01)
*B68G 7/052* (2006.01)
*A47C 7/46* (2006.01)

(58) Field of Classification Search
USPC .................................................. 297/228–229
See application file for complete search history.

(56) References Cited

U.S. PATENT DOCUMENTS

| | | | | | |
|---|---|---|---|---|---|
| 4,396,227 | A * | 8/1983 | Neilson | B60N 2/609 | 297/229 |
| 4,669,779 | A * | 6/1987 | Kaganas | B60N 2/60 | 297/229 |
| 4,676,549 | A | 6/1987 | English | | |
| 5,560,683 | A * | 10/1996 | Penley | B64D 11/0647 | 297/228.13 X |
| 5,615,928 | A * | 4/1997 | Penley | A47C 31/11 | 297/228.13 X |
| 6,089,659 | A * | 7/2000 | Toyota | A47C 31/11 | 297/229 |
| 6,199,231 | B1 | 3/2001 | Zafiroglu | | |
| 6,309,017 | B1 * | 10/2001 | Middleton | A47C 31/113 | 297/219.1 |
| 6,338,527 | B1 * | 1/2002 | Toyota | B60N 2/6054 | 297/229 |
| 6,345,866 | B1 * | 2/2002 | Jackson | B60N 2/6054 | 297/229 |
| 6,447,059 | B1 * | 9/2002 | Jackson | B60N 2/6054 | 297/229 |
| 6,652,026 | B2 * | 11/2003 | Toyota | B60N 2/6054 | 297/229 |
| 7,011,367 | B2 * | 3/2006 | Riley | A47C 31/11 | 297/229 |
| 7,240,964 | B2 * | 7/2007 | Riley | A47C 31/11 | 297/229 |
| 7,422,281 | B2 * | 9/2008 | Miller | A47C 31/11 | 297/229 |
| 7,686,392 | B2 * | 3/2010 | Kenny | B60N 2/6018 | 297/229 |
| 7,780,232 | B2 * | 8/2010 | Miller | A47C 31/11 | 297/229 |
| 7,857,383 | B2 * | 12/2010 | Nguyen | B60N 2/5825 | 297/228.13 |
| 8,046,944 | B2 * | 11/2011 | Nishikawa | G09F 21/049 | 297/228 X |
| 8,465,093 | B2 * | 6/2013 | Janowski | B60N 2/58 | 297/229 |
| 8,770,662 | B2 * | 7/2014 | Mount | B60N 2/5825 | 297/228.1 |
| 9,637,035 | B2 * | 5/2017 | Abe | B60N 2/646 | |
| 10,144,319 | B2 * | 12/2018 | Stevens-Poire' | B60N 2/4249 | |
| 10,251,491 | B2 * | 4/2019 | Nishino | A47C 31/11 | |
| 2007/0040426 | A1 | 2/2007 | Kenny | | |
| 2011/0043013 | A1 | 2/2011 | Sugiura et al. | | |
| 2016/0068089 | A1 * | 3/2016 | Huebner | B60N 3/00 | 297/219.1 |

FOREIGN PATENT DOCUMENTS

| | | | |
|---|---|---|---|
| CN | 107627921 | A | 1/2018 |
| CN | 210047375 | U | 2/2020 |
| DE | 19859039 | A1 | 3/2000 |
| FR | 2690322 | A1 | 10/1993 |
| GB | 1153209 | A1 | 5/1969 |
| GB | 1158281 | A | 7/1969 |
| JP | 2017006443 | A | 1/2017 |

OTHER PUBLICATIONS

Extended European Search Report issued for the corresponding EP patent application No. EP 22 82 5445, dated Mar. 11, 2025, 9 pages (For informational purposes only).
Search Report of corresponding Singapore Patent Application 11202308496V, dated Jul. 2, 2024, 3 pages (for informational purposes only).
Chinese office action with search report issued for the corresponding Chinese patent application No. 202280050495.1, dated Mar. 6, 2026, 13 pages (for informational purposes only).

* cited by examiner

110: 111 – 112
120: 121 – 127
220: 221 – 225

CHAIR COVER

CROSS-REFERENCE TO RELATED APPLICATION

This application is a U.S. National Stage Application of International Application PCT/SG2022/050423, filed Jun. 17, 2022, and claims the benefit of priority to Singapore Patent Application No. 10202106602T filed on 18 Jun. 2021, the contents of the above-listed applications are hereby incorporated by reference in their entirety for all purposes.

TECHNICAL FIELD

Various embodiments relate to a chair cover for covering at least a part of a chair.

BACKGROUND

The following discussion of the background is intended to facilitate an understanding of the present disclosure only. It should be appreciated that the discussion is not an acknowledgement or admission that any of the material referred to was published, known or is part of the common general knowledge of the person skilled in the art in any jurisdiction as of the priority date of the disclosure.

Generic chair covers designed to be compatible with different shapes and/or sizes of chairs are widely used. A conventional generic chair cover is mostly manufactured by stitching two pieces of fabric and using an elastic band tied to edges of the pieces to create a stretch.

However, the conventional chair cover may have some problems. For example, when the chair cover is stretched, the fabric becomes thin and thus a design of the chair covered by the chair cover may be seen through. In addition, with the stretched fabric in a middle of a backrest, chair accessories such as a lumbar cushion and a magnetic head-pillow may neither be compatible nor usable with the chair cover. Moreover, although the chair cover is compatible with the different shapes and/or sizes of chairs, the chair cover may not fit snugly around an awkward curve of the chair, especially, a curve on wings connecting to a middle section having a centreline of the backrest of the chair.

Accordingly, there exists a need for an improved chair cover, that seeks to address at least one of the aforementioned issues.

SUMMARY

According to various embodiments, there is a chair cover for covering at least a part of a chair, the chair cover comprising a plurality of panels comprising: at least one first panel formed of or from a first fabric, and configured to cover at least one middle section having a centreline of the at least the part of the chair; and a plurality of second panels formed of or from a second fabric different from the first fabric and joined together with the at least one first panel, wherein the plurality of second panels are configured to cover edges of the at least the part of the chair surrounding the at least one middle section, wherein the plurality of second panels are configured to be stretched more than the at least one first panel such that the chair cover fits snugly around the edges of the at least the part of the chair.

According to various embodiments, there is a chair cover for covering a chair, the chair cover comprising: a backrest cover for covering a backrest of the chair comprising: a front backrest panel and a rear backrest panel formed of or from a first fabric, and configured to cover a front middle section having a front centreline and a rear middle section having a rear centreline of the backrest of the chair respectively, and a plurality of second backrest panels formed of or from a second fabric different from the first fabric, joined together with at least one of the front backrest panel and the rear backrest panel, and configured to cover edges of the backrest of the chair surrounding the front middle section and the rear middle section; and a seat base cover for covering a seat base of the chair comprising: a top seat base panel formed of or from a third fabric, and configured to cover a middle section having a centreline of the seat base of the chair, and a plurality of second seat base panels formed of or from a fourth fabric different from the third fabric, joined together with the top seat base panel, and configured to cover edges of the seat base of the chair surrounding the middle section, wherein the plurality of second backrest panels are configured to be stretched more than the front backrest panel and the rear backrest panel such that the backrest cover fits snugly around the edges of the backrest of the chair, and the plurality of second seat base panels are configured to be stretched more than the top seat base panel such that the seat base cover fits snugly around the edges of the seat base of the chair.

According to various embodiments, there is a method of manufacturing a chair cover for covering at least a part of a chair comprising steps of: providing at least one first panel formed of or from a first fabric, and configured to cover at least one middle section having a centreline of the at least the part of the chair; providing a plurality of second panels formed of or from a second fabric different from the first fabric, and configured to cover edges of the at least the part of the chair surrounding the at least one middle section; and joining the plurality of second panels together with the at least one first panel, wherein the plurality of second panels are configured to be stretched more than the at least one first panel such that the chair cover fits snugly around the edges of the at least the part of the chair.

According to various embodiments, there is a furniture cover for covering at least a part of a furniture, the furniture cover comprising a plurality of panels comprising: at least one first panel formed of or from a first fabric, and configured to cover at least one middle section having a centreline of the at least the part of the furniture; and a plurality of second panels formed of or from a second fabric different from the first fabric and joined together with the at least one first panel, wherein the plurality of second panels are configured to cover edges of the at least the part of the furniture surrounding the at least one middle section, wherein the plurality of second panels are configured to be stretched more than the at least one first panel such that the furniture cover fits snugly around the edges of the at least the part of the furniture.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1:
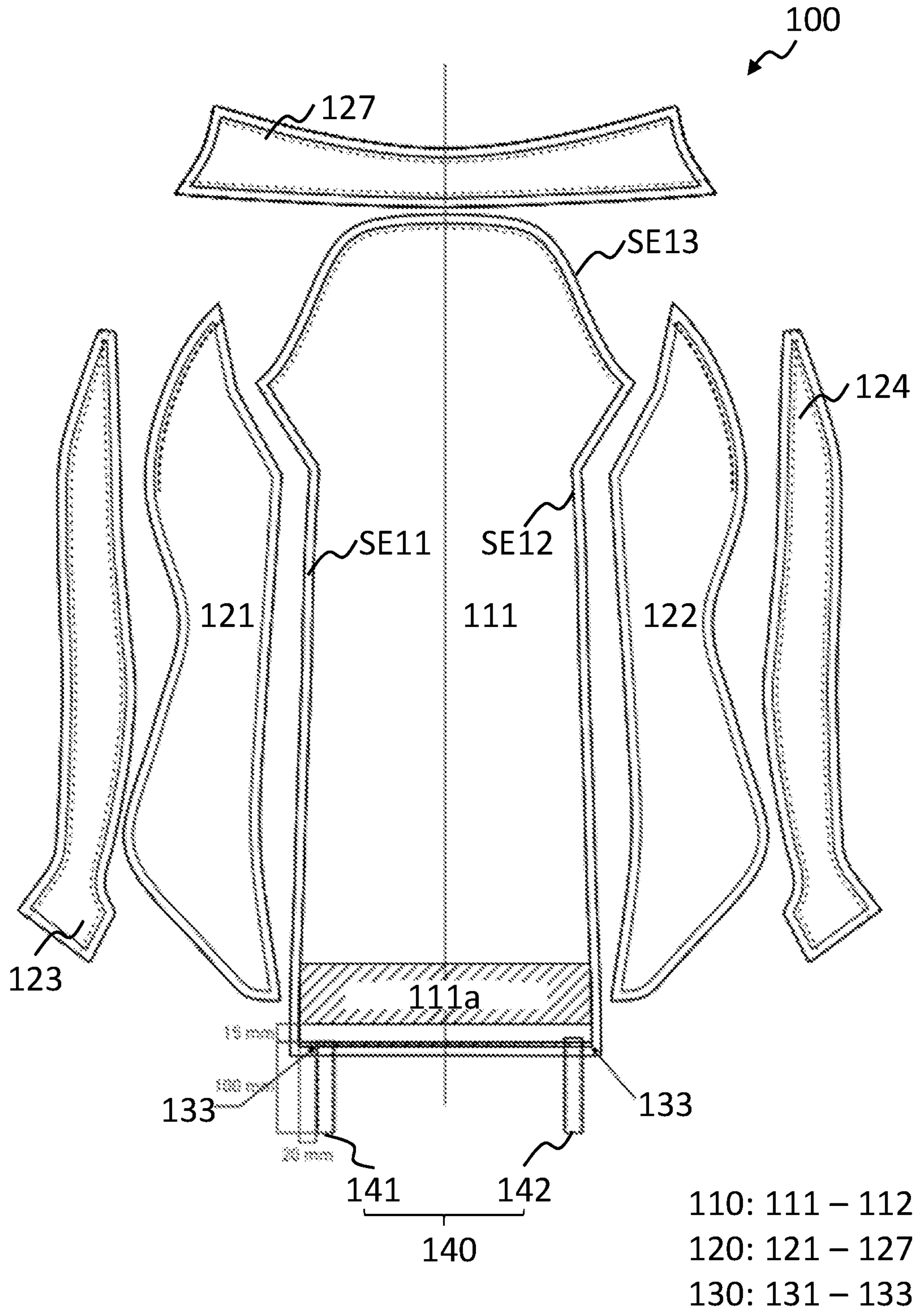
FIG. 1 shows an exploded plan view of a front part of a backrest cover according to various embodiments.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

The disclosure illustratively described herein may suitably be practiced in the absence of any element or elements, limitation or limitations, not specifically disclosed herein. Thus, for example, the terms "comprising", "including," containing", etc. shall be read expansively and without limitation. The word "comprise" or variations such as "comprises" or "comprising" will accordingly be understood to imply the inclusion of a stated integer or groups of integers but not the exclusion of any other integer or group of integers. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the disclosure. Thus, it should be understood that although the present disclosure has been specifically described in exemplary embodiments and optional features, modification and variation of the disclosure embodied herein may be resorted to by those skilled in the art.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements. As used herein, the term "and/or" includes any and all combinations of one or more of the associated listed items.

While terms such as "first", "second" etc., may be used to describe various elements, such elements are not limited to the above terms. The above terms are used only to distinguish one element from another, and do not define an order and/or significance of the elements. Without departing a scope of rights of the specification, a first element may be referred to as a second element, and similarly, the second element may be referred to as the first element.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, structure or any part of any device or structure.

The term "coupled" (or "connected") herein may be understood as mechanically coupled, for example attached or fixed, or just in contact without any fixation, and it will be understood that both direct coupling or indirect coupling (in other words: coupling without direct contact) may be provided.

In addition, the singular terms "a", "an", and "the" include plural references unless context clearly indicates otherwise. Similarly, the word "or" is intended to include "and" unless the context clearly indicates otherwise.

Throughout the description, a term of "chair" refers broadly to a furniture providing a seat for at least one user, for example, a person or a plurality of people. In some embodiments, the chair may include both a backrest and a seat base. In some other embodiments, the chair may include a seat base without a backrest. Examples of the chair may include, but are not limited to, a desk chair such as an office chair and a gaming chair, a dining chair, a sofa, an armchair, a stool, and a car seat.

Throughout the description, a term of "chair cover" (also referred to as a "chair skin") refers broadly to a removable cover that may be secured around at least a part of the chair. In some embodiments, the chair cover may include a plurality of panels. In some embodiments, seams may surround each of the plurality of panels. In some other embodiments, the seams may surround at least a part of the plurality of panels. In some embodiments, lines of top stitches may be provided on some of the plurality of panels.

In some embodiments, the chair cover may include a backrest cover for covering a backrest of the chair. In some embodiments, the chair cover may include a seat base cover for covering a seat base of the chair. In some embodiments, the chair cover may include both the backrest cover and the seat base cover. In some other embodiments, the chair cover may include the backrest cover without the seat base cover. In some other embodiments, the chair cover may include the seat base cover without the backrest cover.

In order that the invention may be readily understood and put into practical effect, various embodiments will now be described by way of examples and not limitations, and with reference to the figures.

Figure 2:
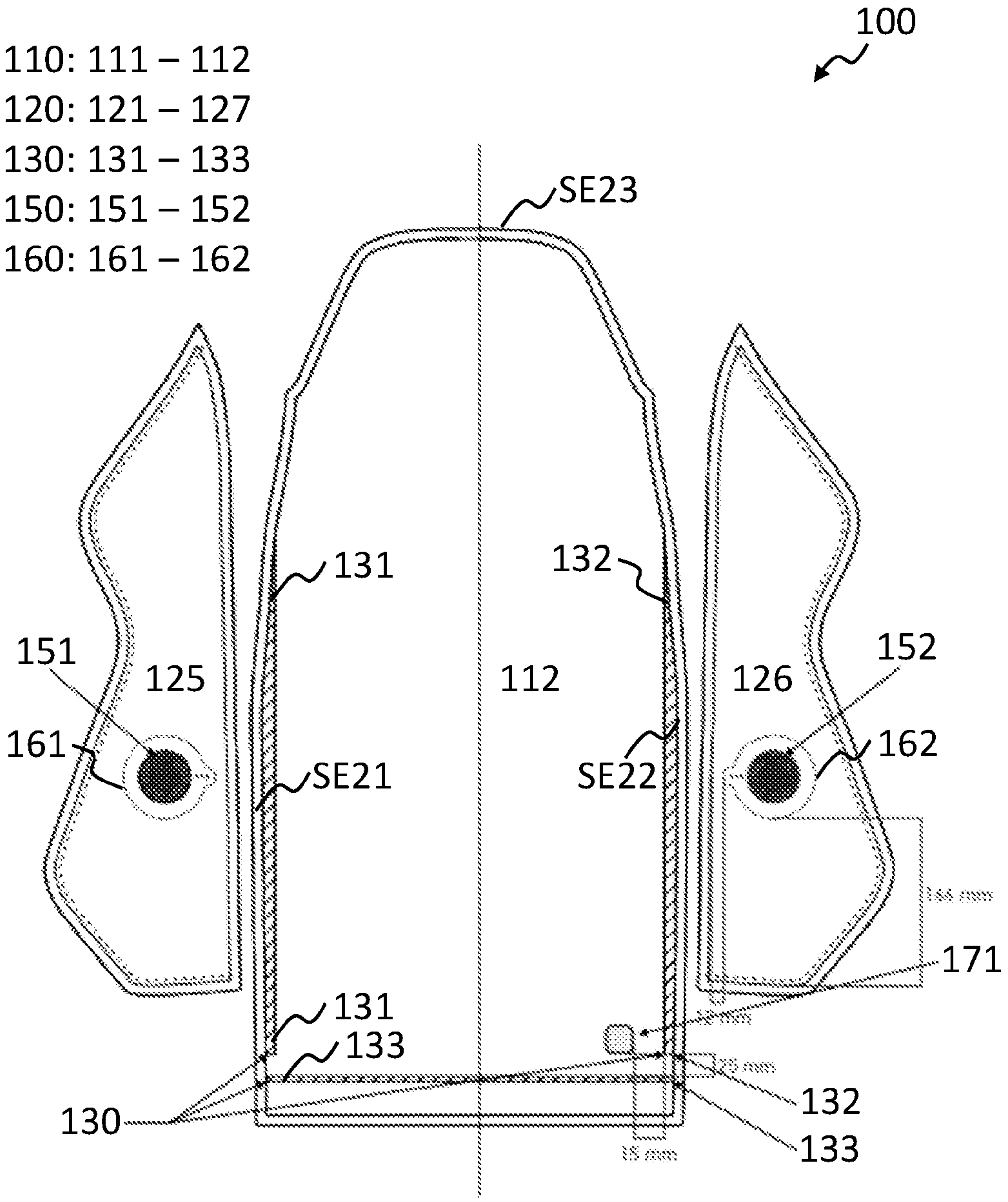
FIG. 2 shows an exploded plan view of a rear part of a backrest cover according to various embodiments.

FIG. 1 shows an exploded plan view of a front part of a backrest cover 100 according to various embodiments. FIG. 2 shows an exploded plan view of a rear part of the backrest cover 100 according to various embodiments. The front part may be referred to a part of the backrest cover 100 mainly facing a user's back during usage of the chair. The rear part may be referred to as an opposite part of the front part.

In some embodiments, the backrest cover 100 may include at least one first panel 110 formed of or from a fabric. The first panel 110 may be configured to cover at least one middle section having a centreline of the backrest of the chair. The backrest cover 100 may further include a plurality of second panels 120 formed of or from a fabric. The plurality of second panels 120 may be joined together with the first panel 110. The plurality of second panels 120 may be configured to cover edges of the backrest of the chair surrounding the at least one middle section.

Figure 5:
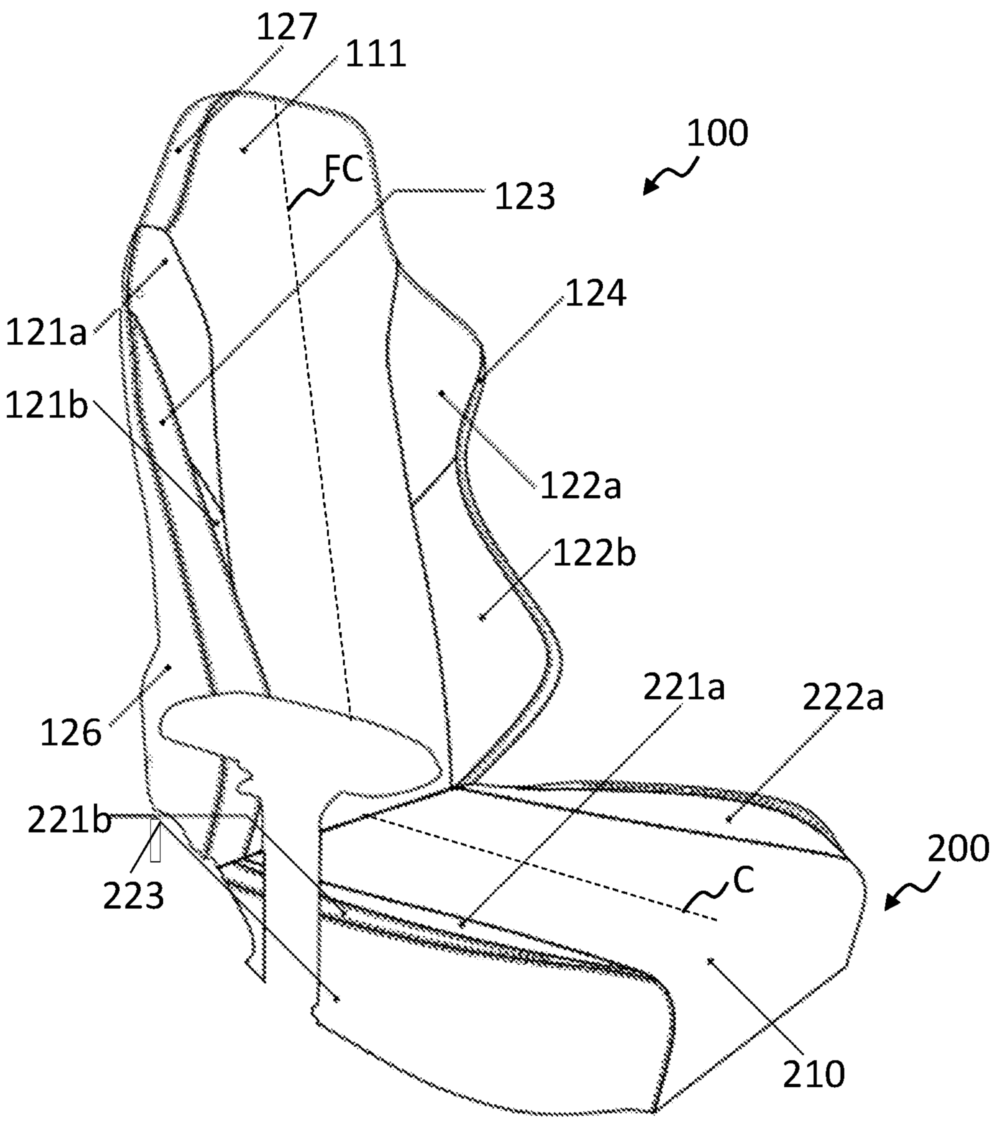
FIG. 5 shows a perspective view of a chair cover according to various embodiments.

As shown in FIGS. 1 and 2, the first panel 110 of the backrest cover 100 may include a front backrest panel 111 and a rear backrest panel 112 configured to cover a front middle section having a front centreline and a rear middle section having a rear centreline of the backrest of the chair respectively. The front middle section may be referred to a section of the backrest of the chair having the front centreline (FC) (as shown in FIG. 5) and mainly facing a user's back during usage of the chair. The rear middle section may be referred to as an opposite section of the front middle section.

As shown in FIGS. 1 and 2, the plurality of second panels 120 configured to cover edges of the backrest of the chair may include a first and second front wing backrest panels 121, 122, a first and second side backrest panels 123, 124, a first and second rear wing backrest panels 125, 126, and a top backrest panel 127.

As shown in FIG. 1, in some embodiments, each of the first and second front wing backrest panels 121, 122 may be disposed on each side edge of the front backrest panel 111. In some embodiments, the first front wing backrest panel 121 may be disposed on a first side edge (SE11) of the front backrest panel 111, and the second front wing backrest panel 122 may be disposed on a second side edge (SE12) opposite to the first side edge (SE11), of the front backrest panel 111.

As shown in FIG. 2, in some embodiments, each of the first and second rear wing backrest panels 125, 126 may be disposed on each side edge of the rear backrest panel 112. In some embodiments, the first rear wing backrest panel 125 may be disposed on a first side edge (SE21) of the rear backrest panel 112, and the second rear wing backrest panel 126 may be disposed on a second side edge (SE22), opposite to the first side edge (SE21), of the rear backrest panel 112.

As shown in FIGS. 1 and 2, in some embodiments, the top backrest panel 127 may be disposed between the front backrest panel 111 and the rear backrest panel 112. In some embodiments, the top backrest panel 127 may be disposed between a third side edge (SE13) of the front backrest panel 111 and a third side edge (SE23) of the rear backrest panel 112. In some embodiments, the top backrest panel 127 may be surrounded by the front backrest panel 111, the rear backrest panel 112, the first front wing backrest panel 121, and the second front wing backrest panel 122.

As shown in FIGS. 1 and 2, in some embodiments, the first side backrest panel 123 may be disposed between the first front wing backrest panel 121 and the second rear wing backrest panel 126. In some embodiments, the second side backrest panel 124 may be disposed between the second front wing backrest panel 122 and the first rear wing backrest panel 125. In some embodiments, the first side backrest panel 123 may be surrounded by the first front wing backrest panel 121 and the second rear wing backrest panel 126. In some embodiments, the second side backrest panel 124 may be surrounded by the second front wing backrest panel 122 and the first rear wing backrest panel 125.

In some embodiments, the plurality of second panels 120 may be configured to be stretched more than the first panel 110 such that the backrest cover 100 fits snugly around the edges. In this manner, the plurality of second panels 120 may be stretched more than the first panel 110 such that the backrest cover 100 fits snugly around the edges, when the backrest cover 100 covers the backrest of the chair. As shown in FIGS. 1 and 2, in some embodiments, the first and second front wing backrest panels 121, 122, the first and second side backrest panels 123, 124, the first and second rear wing backrest panels 125, 126, and the top backrest panel 127 may be configured to be stretched more than the front and rear backrest panels 111, 112 such that the backrest cover 100 fits snugly around the edges of the backrest of the chair, for example, awkward curves of the backrest of the chair.

In some embodiments, the first panel 110 may be formed of or from a first fabric, and the plurality of second panels 120 may be formed of or from a second fabric which is different from the first fabric. In some embodiments, the first fabric may be 100% polyester, and the second fabric may be a combination of spandex and polyester. For example, the second fabric may be a combination of 20% 70D (denier) spandex and 80% polyester.

In some embodiments, the first fabric has a first elasticity and the second fabric has a second elasticity. In some embodiments, the first elasticity may be less than the second elasticity. For example, the front backrest panel 111 may include an embroidery, and the first fabric may have a certain elasticity such that a shape of the embroidery may not be changed when the backrest cover 100 covers the backrest of the chair. In some embodiments, the first fabric of a size of 21 centimetres (cm)×21 centimetres (cm) may be stretchable to a first length. For example, the first length may be equal to or greater than 0 centimetre (cm) and equal to or less than 8 centimetres (cm). In some embodiments, the second fabric of a size of 21 centimetres (cm)×21 centimetres (cm) may be stretchable to a second length. For example, the second length may be equal to or greater than 6 centimetres (cm) and equal to or less than 20 centimetres (cm).

In some embodiments, the second fabric has the second elasticity, and the first fabric does not have an elasticity. For example, in this manner, when the backrest cover 100 covers the backrest of the chair, the first and second front wing backrest panels 121, 122 may be stretched inward to create a 3D effect, as the first fabric does not have the elasticity. As another example, the front backrest panel 111 may include the embroidery. As the first fabric may not have the elasticity, the shape of the embroidery may not be changed when the backrest cover 100 covers the backrest of the chair.

In some embodiments, the first panel 110 may not be stretched in both a lateral direction and a longitudinal direction. In some other embodiments, the first panel 110 may not be stretched in the lateral direction, but may be stretched in the longitudinal direction at a certain level such that the shape of the embroidery may not be changed when the backrest cover 100 covers the backrest of the chair. In some other embodiments, the first panel 110 may not be stretched in the longitudinal direction, but may be stretched in the lateral direction at a certain level such that the shape of the embroidery of the first panel 110 may not be changed when the backrest cover 100 covers the backrest of the chair.

In some embodiments, the second elasticity of the second fabric may include a second lateral elasticity and a second longitudinal elasticity, and the second lateral elasticity may be different from the second longitudinal elasticity. In some embodiments, the second lateral elasticity may be greater than the second longitudinal elasticity. For example, the plurality of second panels 120 may be stretchable to 15 centimetres (cm) in a lateral direction and to 6 centimetres (cm) in a longitudinal direction.

In some embodiments, the first fabric has a first thickness and the second fabric has a second thickness. In some embodiments, the first thickness may be less than the second thickness. In some embodiments, the front backrest panel 111 may include an embroidery, and the first fabric may have a certain thickness such that a quality of the front backrest panel 111 including the embroidery may be kept in shape. In some embodiments, the first thickness may be equal to or greater than 0.11 millimetres (mm) and equal to or less than 0.22 millimetres (mm). In some embodiments, the second thickness may be equal to or greater than 0.11 millimetres (mm) and equal to or less than 0.22 millimetres (mm).

In some embodiments, the first fabric has a first grammage and the second fabric has a second grammage. In some embodiments, the first grammage may be greater than the second grammage. In some embodiments, the first grammage may be equal to or greater than 150 $g/m^2$ and equal to or less than 800 $g/m^2$. In some embodiments, and the second grammage may be equal to or greater than 150 $g/m^2$ and equal to or less than 800 $g/m^2$.

In some embodiments, the first fabric may have a greater grammage than the second fabric, and be woven to be thinner and be less elastic than the second fabric, so that the embroidery of the first fabric (for example, the front backrest panel 111) may hold on the first fabric for elaborate designs. For example, the first grammage may be 720 $g/m^2$, the first thickness may be 0.154 mm±0.3%, and the first fabric may be stretchable to 3 centimetres (cm). In some embodiments, the second fabric may have a smaller grammage than the first fabric, and be woven to be thicker and be more elastic than the first fabric, so that the second fabric may be stretchy to fit the form of the chair. For example, the second grammage may be 584 $g/m^2$, the second thickness may be 0.17 mm±0.3%, and the second fabric may be stretchable to 15 centimetres (cm).

In some embodiments, the plurality of panels may be joined to form the backrest cover 100. In some embodiments, some of the plurality of panels (hereinafter, also referred to as a "second group of the plurality of panels") may be permanently joined, for example, by stitches, and the others (hereinafter, also referred to as a "first group of the plurality of panels") may be attachably joined, for example, by a fastening means 130. In some embodiment, the fastening means 130 may be arranged at, at least one interface between two adjacent panels of the first group of the plurality of panels, and configured to removably secure the two adjacent panels. In some embodiments, two adjacent panels of the second group of the plurality of panels may be joined by stitches to permanently secure the two adjacent panels.

In some embodiments, the fastening means 130 may be configured to removably secure the backrest cover 100. For example, the user may secure the backrest cover 100 by using the fastening means 130. In some embodiments, the fastening means 130 may include, but is not limited to, at least one of the following: a zipper, a band, a buckle, a snap button, a clip, and any combination thereof.

As shown in FIG. 2, in some embodiments, the backrest cover 100 may include a first and second fastening means 131, 132. The first fastening means 131 may be arranged at an interface between the rear backrest panel 112 and the first rear wing backrest panel 125. The second fastening means 132 may be arranged at an interface between the rear backrest panel 112 and the second rear wing backrest panel 126. For example, the first fastening means 131 may be a zipper (hereinafter, also referred to as a "first zipper 131"), and the second fastening means 132 may be a zipper (hereinafter, also referred to as a "second zipper 132"). As shown in FIG. 2, the first zipper 131 may be arranged along the interface between the rear backrest panel 112 and the first rear wing backrest panel 125 to removably secure the rear backrest panel 112 and the first rear wing backrest panel 125, and the second zipper 132 may be arranged along the interface between the rear backrest panel 112 and the second rear wing backrest panel 126 to removably secure the rear backrest panel 112 and the second rear wing backrest panel 126.

As shown in FIGS. 1 and 2, in some embodiments, the backrest cover 100 may include a third fastening means 133. The third fastening means 133 may be arranged at an interface between the front backrest panel 111 and the rear backrest panel 112. For example, the third fastening means 133 may be a zipper (hereinafter, also referred to as a "third zipper 133").

Although FIGS. 1 and 2 depict zippers as the first, second and third fastening means 131, 132, 133, it may be appreciated that the first, second and third fastening means 131, 132, 133 may be another type of fastening means. For example, the first and second fastening means 131, 132 may be snap buttons, and the third fastening means 133 may be a zipper. As another example, the first and second fastening means 131, 132 may be zippers, and the third fastening means 133 may be a buckle, for example, a quick release buckle.

In some embodiments, the backrest cover 100 may include at least one loop 140 configured to be pulled such that the backrest cover 100 is straightened. As shown in FIG. 1, in some embodiments, the front backrest panel 111 may include a pair of loops 141, 142 (hereinafter, also referred to as a "first loop 141" and a "second loop 142") configured to be pulled such that the front backrest panel 111 is straightened. In some embodiments, the first and second loops 141, 142 may be formed of or from a fifth fabric. In some embodiments, the fifth fabric may not be stretched. For example, the fifth fabric is 100% polyester. For example, the fifth fabric is a suede. As an example, a length of the first and second loops 141, 142 may be 10 centimetres (cm). The user may pull and tug the first and second loops 141, 142 to straighten the front backrest panel 111 when the backrest cover 100 covers the backrest of the chair.

In some embodiments, the backrest cover 100 may include at least one hole 150 configured to allow a protruding member of the backrest of the chair to be penetrated therethrough. For example, a pair of lumbar knobs configured to adjust a lumbar support of the chair may be arranged at a pair of side surfaces of the backrest of the chair. As shown in FIG. 2, in some embodiments, the first and second rear wing backrest panels 125, 126 may include holes 151, 152 (hereinafter, also referred to as "a first hole 151" and a "second hole 152"), to allow the pair of lumbar knobs to be penetrated therethrough.

In some embodiments, the backrest cover 100 may include at least one ring 160 covering an edge of the hole 150, to prevent the at least one of the first and second rear wing backrest panels 125, 126 from being overstretched when the protruding member is penetrated through the hole 150. In some embodiments, the at least one ring 160 may be formed of or from a rigid material, such as plastic or metal. As shown in FIG. 2, in some embodiments, the first and second rear wing backrest panels 125, 126 may include rings 161, 162 (hereinafter, also referred to as "a first ring 161" and a "second ring 162") covering an edge of the first hole 151 and an edge of the second hole 152 respectively. In some embodiments, a material used around at least one of the first ring 161 and the second ring 162 may include at least one of a PVC (polyvinyl chloride), a fabric, a silicone, and any combination thereof.

Figure 3:
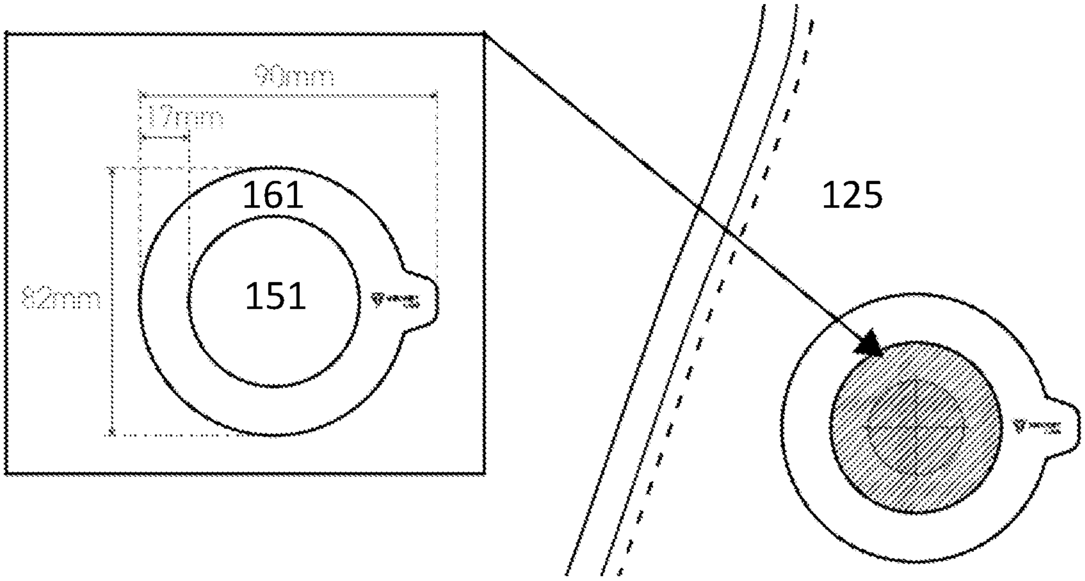
FIG. 3 shows an enlarged view of a hole and a ring of the backrest cover according to various embodiments.

FIG. 3 shows an enlarged view of the first hole 151, and the first ring 161 of the backrest cover 100 according to various embodiments. As shown in FIG. 3, the first hole 151, and the first ring 161 covering the edge of the first hole 151 may be arranged in the first rear wing backrest panel 125 of the backrest cover 100. Although not shown, when the backrest cover 100 covers the backrest of the chair, a lumbar knob may be penetrated through the first hole 151. Since the first ring 161 covering the edge of the first hole 151 is provided, the first rear wing backrest panel 125 may not be overstretched, even though the lumbar knob is penetrated through the first hole 151.

Returning to FIG. 2, in some embodiments, the backrest cover 100 may further include a label 171 indicating a size of the chair cover (for example, the backrest cover 100). For example, the label 171 may be attached to the rear backrest panel 112. In some embodiments, a size of the label 171 may vary depending on the size of the chair cover (for example, the backrest cover 100).

Although not shown, in some embodiments, the backrest cover 100 may further include an electronic tag, for example, an NFC (near field communication) tag, configured to communicate with an electronic device of the user to provide information about the chair cover. In some embodiments, the NFC tag may be attached to the rear backrest panel 112. For example, when the electronic device tags the NFC tag, the electronic device may receive information about whether the chair cover was manufactured by an authorised manufacturer.

Figure 4:
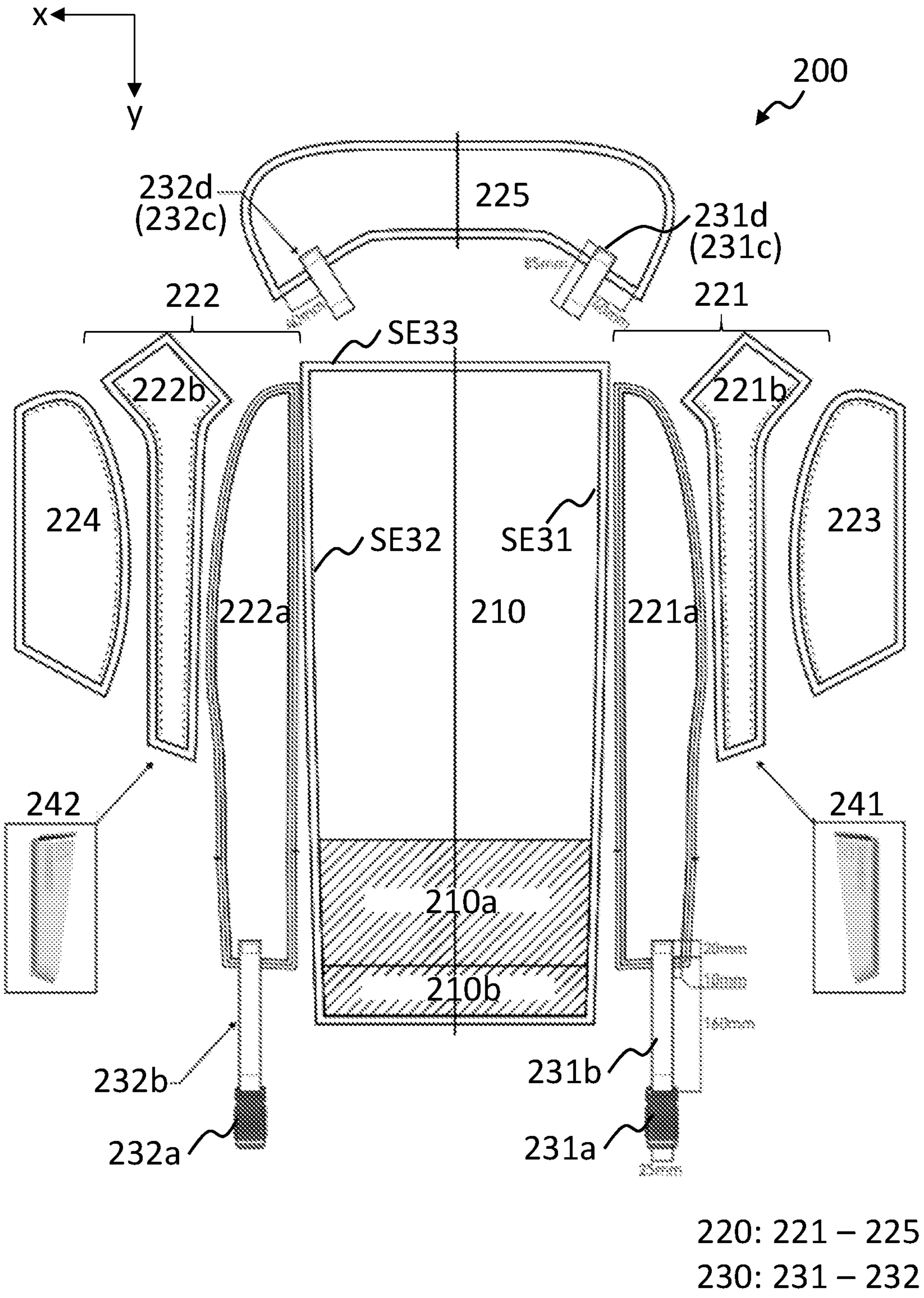
FIG. 4 shows an exploded plan view of a seat base cover according to various embodiments.

FIG. 4 shows an exploded plan view of a seat base cover 200 according to various embodiments.

In some embodiments, the seat base cover 200 may include at least one first panel 210 formed of or from a fabric. The first panel 210 may be configured to cover at least one middle section having a centreline of the seat base of the chair. The seat base cover 200 may further include a plurality of second panels 220 formed of or from a fabric. The plurality of second panels 220 may be joined together with the first panel 210. The plurality of second panels 220 may be configured to cover edges of the seat base of the chair surrounding the at least one middle section.

As shown in FIG. 4, the first panel 210 of the seat base cover 200 may include a top seat base panel 210 configured to cover the middle section of the seat base of the chair. The middle section may be referred to a section of the seat base of the chair having the centreline (C) (as shown in FIG. 5) and mainly facing a user's seat during usage of the chair.

As shown in FIG. 4, the plurality of second panels 120 configured to cover edges of the seat base of the chair may include a first and second wing seat base panels 221, 222, a first and second side seat base panels 223, 224, and a front seat base panel 225.

As shown in FIG. 4, in some embodiments, the first wing seat base panel 221 may be disposed between the top seat base panel 210 and the first side seat base panel 223. In some embodiments, the first wing seat base panel 221 may be disposed on a first side edge (SE31) of the top seat base panel 210. In some embodiments, the second wing seat base panel 222 may be disposed between the top seat base panel 210 and the second side seat base panel 224. In some embodiments, the second wing seat base panel 222 may be disposed on a second side edge (SE32), opposite to the first side edge (SE31) of the top seat base panel 210.

As shown in FIG. 4, in some embodiments, the front seat base panel 225 may be disposed on a third side edge (SE33) of the top seat base panel 210.

As shown in FIG. 4, in some embodiments, the first wing seat base panel 221 may include a plurality of first wing seat base panels 221*a*, 221*b*. In some embodiments, the second wing seat base panel 222 may include a plurality of second wing seat base panels 222*a*, 222*b*. It may be appreciated that the number of the plurality of first wing seat base panels 221*a*, 221*b* and the number of the plurality of second wing seat base panels 222*a*, 222*b* are not limited to two (2).

In some embodiments, the plurality of second panels 220 may be configured to be stretched more than the first panel 210 such that the seat base cover 200 fits snugly around the edges. In this manner, the plurality of second panels 220 may be stretched more than the first panel 210 such that the seat base cover 200 fits snugly around the edges when the seat base cover 200 covers the seat base of the chair. As shown in FIG. 4, in some embodiments, the first and second wing seat base panels 221, 222, the first and second side seat base panels 223, 224, and the front seat base panel 225 may be configured to be stretched more than the top seat base panel 210 such that the seat base cover 200 fits snugly around the edges of the seat base of the chair, for example, awkward curves of the seat base of the chair.

In some embodiments, the first panel 210 may be formed of or from a third fabric, and the plurality of second panels 220 may be formed of or from a fourth fabric which is different from the third fabric. In some embodiments, the third fabric of the first panel 210 of the seat base cover 200 may be the same as the first fabric of the first panel 110 of the backrest cover 100 described with reference to FIGS. 1 and 2. In some embodiments, the fourth fabric of the plurality of second panels 220 of the seat base cover 200 may be the same as the second fabric of the plurality of second panels 120 of the backrest cover 100 described with reference to FIGS. 1 and 2. Here, the third fabric and the fourth fabric may be referred to as the first fabric and the second fabric respectively described with reference to FIGS. 1 and 2, and repeated descriptions will be omitted.

In some other embodiments, the third fabric of the first panel 210 of the seat base cover 200 may be different from the first fabric of the first panel 110 of the backrest cover 100 described with reference to FIGS. 1 and 2. For example, the top seat base panel 210 may not include an embroidery, and thus an elasticity of the top seat base panel 210 may be greater than an elasticity of the front backrest panel 111, and/or a thickness of the top seat base panel 210 may be greater than a thickness of the front backrest panel 111.

In some embodiments, the fourth fabric of the plurality of second panels 220 of the seat base cover 200 may be different from the second fabric of the plurality of second panels 120 of the backrest cover 100 described with reference to FIGS. 1 and 2. For example, the seat base of the chair may be less curved than the backrest of the chair, and thus an elasticity of the plurality of second panels 220 of the seat base cover 200 may be less than the second elasticity of the plurality of second panels 120 of the backrest cover 100.

In some embodiments, the plurality of panels may be joined to form the seat base cover 200. In some embodiments, some of the plurality of panels (hereinafter, also referred to as a "second group of the plurality of panels") may be permanently joined, for example, by stitches, and the others (hereinafter, also referred to as a "first group of the plurality of panels") may be attachably joined, for example, by a fastening means 230. In some embodiment, the fastening means 130 may be arranged at, at least one interface between two adjacent panels of the first group of the plurality of panels, and configured to removably secure the two adjacent panels. In some embodiments, two adjacent panels of the second group of the plurality of panels may be joined by stitches to permanently secure the two adjacent panels.

In some embodiments, the fastening means 230 may be configured to removably secure the seat base cover 200. For example, the user may secure the seat base cover 200 by using the fastening means 230. In some embodiments, the fastening means 230 may include, but is not limited to, at least one of the following: a zipper, a band, a buckle, a snap button, a clip, and any combination thereof.

As shown in FIG. 4, in some embodiments, the fastening means 230 may include a fourth and a fifth fastening means 231, 232. The fourth fastening means 231 may be arranged at an interface between the first wing seat base panel 221 (for example, 221*a*) and the front seat base panel 225 to removably secure the first wing seat base panel 221 and the front seat base panel 225. The fifth fastening means 232 may be arranged at an interface between the second wing seat base panel 222 (for example, 222*a*) and the front seat base panel 225 to removably secure the second wing seat base panel 222 and the front seat base panel 225. For example, the fourth fastening means 231 may be a quick release buckle set (hereinafter, also referred to as a "first quick release buckle set 231"), and the fifth fastening means 232 may be a quick release buckle set (hereinafter, also referred to as a "second quick release buckle set 232").

As shown in FIG. 4, in some embodiments, the first quick release buckle set 231 may include a first quick release buckle including a male component 231*a* and a female component 231*c* of the first quick release buckle. The first quick release buckle set 231 may further include straps including a first strap 231*b* attached to the first wing seat base panel 221 (for example, 221*a*) and a second strap 231*d* attached to the front seat base panel 225. The male component 231*a* of the first quick release buckle is arranged at or near an edge of the first strap 231*b*, and the female component 231*c* of the first quick release buckle is arranged at or near an edge of the second strap 231*d*.

As shown in FIG. 4, in some embodiments, the second quick release buckle set 232 may include a second quick release buckle including a male component 232*a* and a female component 232*c* of the second quick release buckle. The second quick release buckle set 232 may further include straps including a third strap 232*b* attached to the second wing seat base panel 222 (for example, 222*a*) and a fourth strap 232*d* attached to the front seat base panel 225. The male component 232*a* of the second quick release buckle is arranged at or near an edge of the third strap 232*b*, and the female component 232*c* of the second quick release buckle is arranged at or near an edge of the fourth strap 232*d*.

In some embodiments, at least one of the first, second, third and fourth straps 231*b*, 231*d*, 232*b*, 232*d* may include an elastic strap. In some other embodiments, the first, second, third and fourth straps 231*b*, 231*d*, 232*b*, 232*d* may not have elasticity. In some embodiments, at least one of the first, second, third and fourth straps 231*b*, 231*d*, 232*b*, 232*d* may be adjustable. For example, the first and third straps 231*b*, 232*b* may be adjustable. The user may adjust lengths of the first and third straps 231*b*, 232*b* using the male component 231*a* of the first quick release buckle and the male component 232*a* of the second quick release buckle. In this manner, the seat base cover 200 may still fit the seat base of the chair, even though any one of the first, second, third and fourth straps 231*b*, 231*d*, 232*b*, 232*d* is loosened.

Although FIG. 4 depicts buckles as the fourth and fifth fastening means 231, 232, it may be appreciated that the fourth and fifth fastening means 231, 232 may be another type of fastening means. For example, each of the fourth and fifth fastening means 231, 232 may be a pair of bands configured to be manually tied together.

In some embodiments, the seat base cover 200 may include a component 240 (also referred to as a "barrier kit") configured to be inserted in a recline cover covering a part of the seat base of the chair to minimise squeakiness on the seat base during usage of the seat base of the chair. In some embodiments, there are a pair of recline covers (hereinafter, also referred to as a "first recline cover" and a "second recline cover") covering a part of each side of the seat base of the chair. As shown in FIG. 4, in some embodiments, the first wing seat base panel 221 (for example, 221*a*) and the second wing seat base panel 222 (for example, 222*a*) may include components 241, 242 (hereinafter, also referred to as a "first component 241" and a "second component 242") respectively. The first component 241 may be inserted in the first recline cover, and the second component 242 may be inserted in the second recline cover. In this manner, the squeakiness on the seat base may be minimised during usage of the seat base of the chair.

Figure 6:
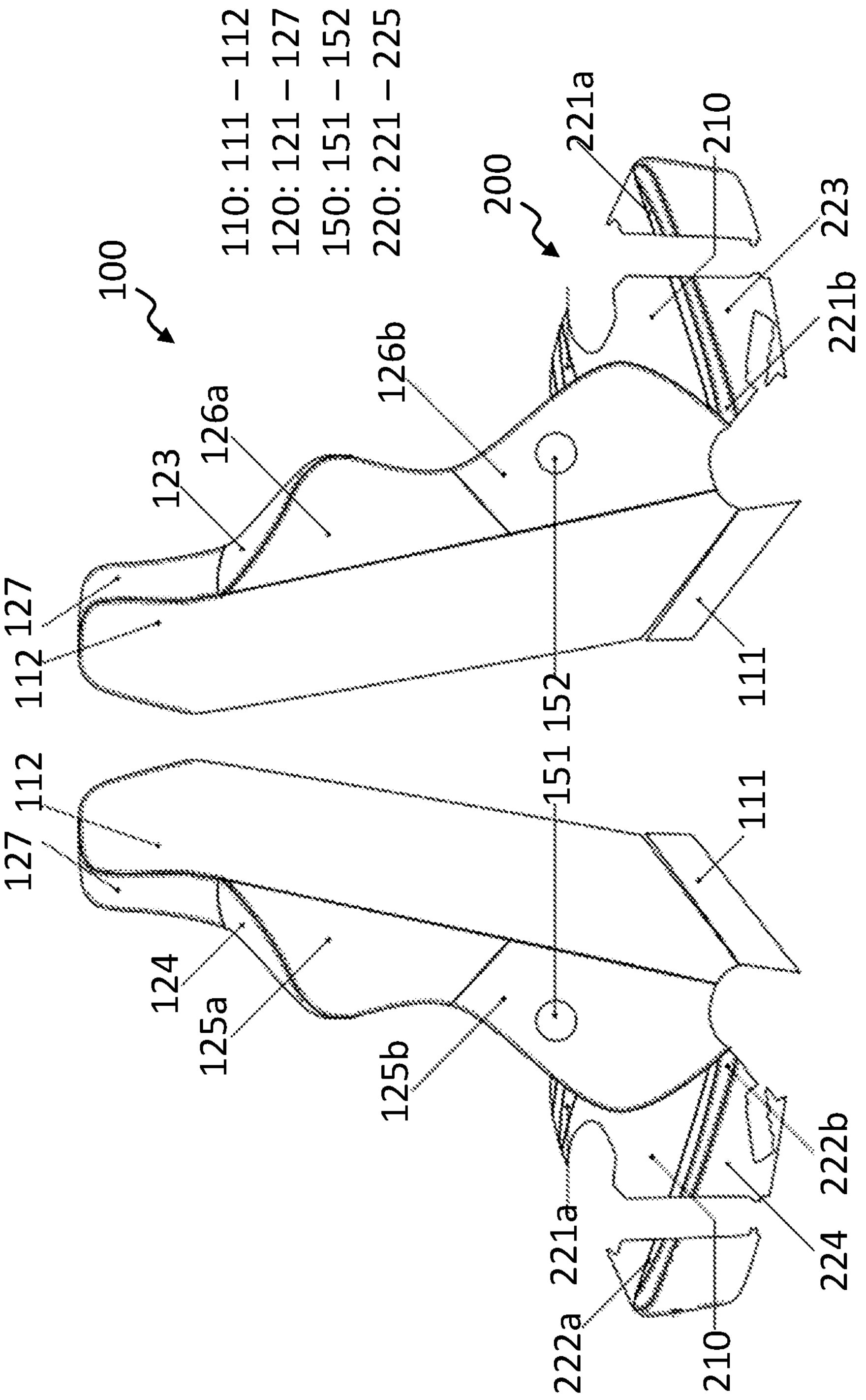
FIG. 6 shows a perspective view of a chair cover according to various embodiments.

FIG. 5 shows a perspective view of a chair cover according to various embodiments. FIG. 6 shows a perspective view of the chair cover according to various embodiments. FIGS. 5 and 6 show the chair cover covering the chair.

As shown in FIGS. 5 and 6, the chair cover may include a backrest cover 100 and a seat base cover 200. However, it may be appreciated that the chair cover may include the backrest cover 100 without the seat base cover 200, or include the seat base cover 200 without the backrest cover 100.

As shown in FIGS. 5 and 6, where the backrest cover 100 and the seat base cover 200 are used, some parts of the backrest cover 100 and the seat base cover 200 may be partially hidden. In FIG. 1, a hatched area 111*a* is for indicating that the area 111*a* may be partially hidden when the chair cover covers the chair. In FIG. 4, hatched areas 210*a*, 210*b* are for indicating that the areas 210*a*, 210*b* may be partially hidden when the chair cover covers the chair.

In some embodiments, the backrest cover 100 may be configured to cover a backrest of the chair. The backrest cover 100 may include a front backrest panel 111 and a rear backrest panel 112 configured to cover a front middle section having a front centreline (FC) and a rear middle section of the backrest of the chair respectively. The backrest cover 100 may further include a plurality of second backrest panels 120 configured to cover edges of the backrest of the chair surrounding the front middle section and the rear middle section. The plurality of second backrest panels 120 may include a first and second front wing backrest panels 121, 122, a first and second side backrest panels 123, 124, a first and second rear wing backrest panels 125, 126, and a top backrest panel 127.

As shown in FIG. 5, in some embodiments, the first front wing backrest panel 121 may include a plurality of first front wing backrest panels 121*a*, 121*b*. In some embodiments, the second front wing backrest panel 122 may include a plurality of second front wing backrest panels 122*a*, 122*b*. It may be appreciated that the number of the plurality of first front wing backrest panels 121*a*, 121*b* and the number of the plurality of second front wing backrest panels 122*a*, 122*b* are not limited to two (2). In some embodiments, different fabrics may be used to each of the plurality of first front wing backrest panels 121*a*, 121*b*. For example, at least one property (for example, an elasticity, a thickness and a grammage) of the fabrics formed the each of the plurality of first front wing backrest panels 121*a*, 121*b* may be different.

As shown in FIG. 6, in some embodiments, the first rear wing backrest panel 125 may include a plurality of first rear wing backrest panels 125*a*, 125*b*. In some embodiments, the second rear wing backrest panel 126 may include a plurality of second rear wing backrest panels 126*a*, 126*b*. It may be appreciated that the number of the plurality of first rear wing backrest panels 125*a*, 125*b* and the number of the plurality of second rear wing backrest panels 126*a*, 126*b* are not limited to two (2). In some embodiments, different fabrics may be used to each of the plurality of first rear wing backrest panels 125*a*, 125*b*. For example, at least one property (for example, an elasticity, a thickness and a grammage) of the fabrics formed the each of the plurality of first rear wing backrest panels 125*a*, 125*b* may be different.

In some embodiments, the seat base cover 200 may be configured to cover a seat base of the chair. The seat base cover 200 may include a top seat base panel 210 configured to cover a middle section having a centreline (C) of the seat base of the chair. The seat base cover 200 may further include a plurality of second seat base panels 220 configured to cover edges of the seat base of the chair surrounding the middle section. The plurality of second seat base panels 220 may include a first and second wing seat base panels 221, 222, a first and second side seat base panels 223, 224, and a front seat base panel 225.

As shown in FIGS. 5 and 6, in some embodiments, the first wing seat base panel 221 may include a plurality of first wing seat base panels 221*a*, 221*b*. In some embodiments, the second wing seat base panel 222 may include a plurality of second wing seat base panels 222*a*, 222*b*. It may be appreciated that the number of the plurality of first wing seat base panels 221*a*, 221*b* and the number of the plurality of second wing seat base panels 222*a*, 222*b* are not limited to two (2). In some embodiments, different fabrics may be used to each of the plurality of first wing seat base panels 221*a*, 221*b*. For example, at least one property (for example, an elasticity, a thickness and a grammage) of the fabrics formed the each of the plurality of first wing seat base panels 221*a*, 221*b* may be different.

In some embodiments, the plurality of second backrest panels 120 may be configured to be stretched more than the front backrest panel 111 and the rear backrest panel 112 such that the backrest cover 100 fits snugly around the edges of the backrest of the chair. In some embodiments, the plurality of second seat base panels 220 may be configured to be stretched more than the top seat base panel 210 such that the seat base cover 200 fits snugly around the edges of the seat base of the chair. Advantageously, the chair cover may fit snugly around the edges of the chair (for example, awkward curves of the chair as shown in FIGS. 5 and 6) due to the higher elasticity of the plurality of second backrest panels 120 and the plurality of second seat base panels 220.

In some embodiments, the front backrest panel 111 and the rear backrest panel 112 may be formed of or from a first fabric, and the plurality of second backrest panels 120 may be formed of or from a second fabric. In some embodiments, the top seat base panel 210 may be formed of or from a third fabric, and the plurality of second backrest panels 120 may be formed of or from a fourth fabric. In some embodiments, the first fabric may be the same as the third fabric. In some embodiments, the second fabric may be the same as the fourth fabric. In some other embodiments, the first fabric may be different from the third fabric, and/or the second fabric may be different from the fourth fabric.

Figure 7:
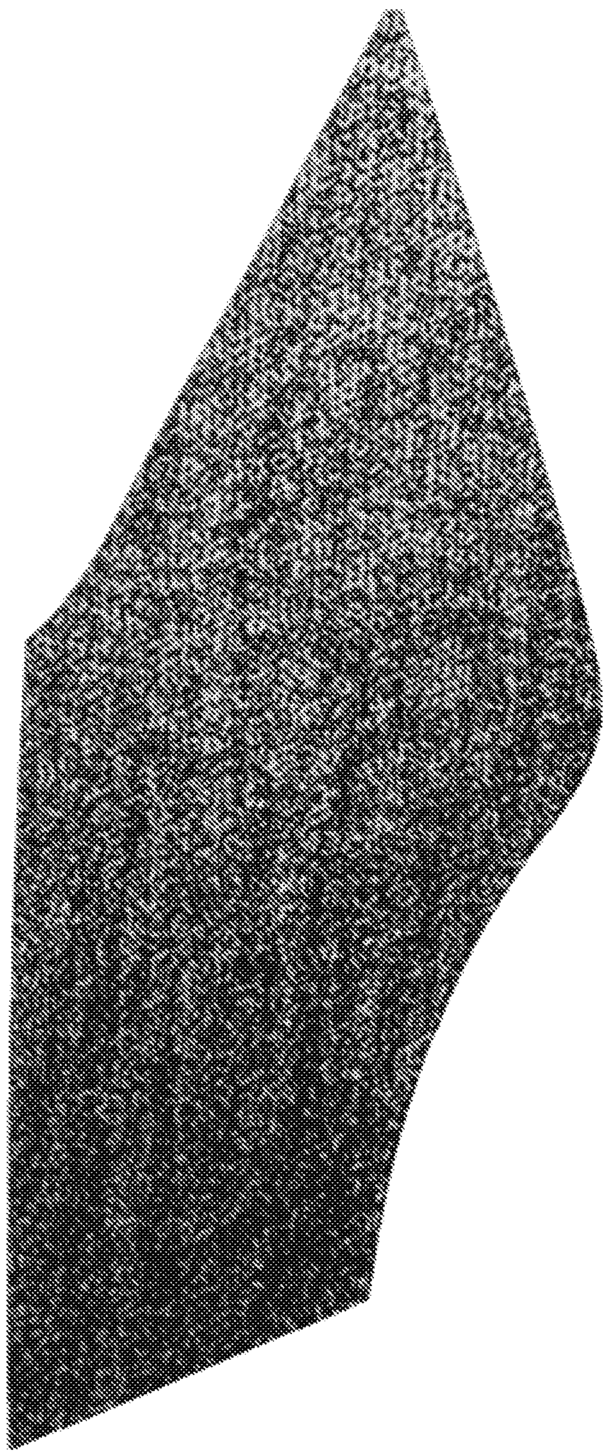
FIG. 7 shows an exemplary view of a cut section of a fabric according to various embodiments.

FIG. 7 shows an exemplary view of a cut section of a fabric according to various embodiments.

In some embodiments, at least one of fabrics described above (for example, the first, the second, the third, the fourth and the fifth fabric) may be produced using a circular knitting process. In some embodiments, the at least one of the fabrics may display a design formed during the circular knitting process. In some embodiments, the design is formed by controlling a ratio of different coloured threads used during the circular knitting process.

The circular knitting method may currently be used in clothing and footwear industries. Such methods may for example be used in production of socks and sweaters, or to produce an upper of a runner or other sport shoe. In some embodiments, the circular knitting method may be adapted for use in production of the at least one of the fabrics. In some embodiments, the circular knitting method may be adapted to allow for more detailed designs to be displayed by the at least one of the fabrics produced using the circular knitting method (hereinafter, referred to as a "fabric" in the description with reference to FIG. 7).

In some embodiments, the detailed designs may include a design utilising a gradient colour design where a transition from a light to dark colour may be shown on the fabric. Such a gradient design may be shown in FIG. 7.

In some embodiments, the detailed designs may be achieved by using the circular knitting process by controlling the ratio of the different thread colours on a loom of a circular knitting machine used to produce the fabric, which may in turn control the colour design shown on the fabric.

In some embodiments, the machine used to produce the fabric and the colour design within that fabric using the circular knitting process may be a Santoni Multifunctional Jacquard Machine. That machine may include a plurality of feeds for feeding threads into the machine. These feeds may automatically be configured by a microprocessor based programming system to control an operation of the feeds and different parameters of the machine such as stitch density, takedown speed, etc. This may allow the machine to be controlled to generate the desired design, and specifically the gradient colour design within the fabric.

In the case of the gradient colour design within the fabric, the machine may be controlled using the following steps:

a) creating a fabric design template for the machine based on a design proof for the fabric;
b) generating a process organization chart for the machine; and
c) modifying machine parameters of the machine, thread colours and ratio of threads until the gradient colour design within the fabric being produced is achieved.

A more specific design within the fabric may also be generated by controlling the machine according to the following steps:

a) creating a fabric design template for the machine based on a design proof of the fabric;
b) generating a process organization chart for the machine; and
c) once the threads of different colour are respectively fed into the machine, modifying machine parameters of the machine until the intended design is achieved.

While the Santoni machine is described as an example of the machine to produce the fabric, machines from other manufacturers may also be controlled using similar steps to produce the fabric with the desired design.

The different fabric materials produced using the circular knitting machine may have fabric specifications as shown in Table 1 below.

TABLE 1

| Fabric Specifications | |
|---|---|
| Face composition | 100% Polyester |

TABLE 1-continued

| Fabric Specifications | |
|---|---|
| Backing type | Composite backing |
| Backing content % | 100% Polyester |
| Fabric weight | 500 and 720 g/m$^2$ |
| Fabric weave construction | Circular woven & composite backing fabric |
| Yarn composition | 100% Polyester |
| Warp | 100% Polyester |
| Weft | 100% Polyester |
| Yarn type | Dyed yarn, twisted yarn |
| Yarn count | 150D |

It has been found that the fabric produced using the circular knitting process has improved strength and durability as compared to other types of weaved fabric. This is evidenced by the Fabric Test Specifications shown in Table 2 below.

TABLE 2

| Fabric Test Specifications | |
|---|---|
| ASTM D737-18 - Standard Test Method for air permeability of textile fabrics | 68.7 ft$^3$/min/ft$^2$ |
| ISO 13934-1: 2013 - Determination of maximum force and elongation at maximum force using the strip method (Force at Breakage) | Warp direction: 1127.43N<br>Weft direction: 950.84N |
| ISO 13934-1: 2013 - Determination of maximum force and elongation at maximum force using the strip method (Elongation at Maximum Force) | Warp direction: 78.20%<br>Weft direction: 53.70% |
| ISO 13937-2: 200 - Determination of tear force of trouser-shaped test specimens (Single tear method) | Warp direction: 235.01N<br>Weft direction: 206.71N |
| BS EN ISO 12947-2: 2016 - Determination of the abrasion resistance of fabrics by the Martindale method (200000 cycles) | No thread breakage<br>No fabric rupture |
| California Proposition 65 (Prop-65) - Phthalate Content | PASS |
| California Proposition 65 (Prop-65) - Flame Retardants | PASS |
| ISO 105-x12: 2016 - Colour Fastness to Rubbing (Wet/Dry) | Dry: 4-5<br>Wet: 4-5 |
| ISO 105-B02: 2013 Colorfastness to light | Grade 5 |
| ISO 105-E04: 2013 Colorfastness to perspiration | Acidic perspiration: 4-5<br>Alkaline perspiration: 4-5 |
| Candidate list of substances of very high concern for authorization published by European Chemicals Agency (ECHA) regarding regulation (EC) No. 1907/2006 concerning REACH | NOT DETECTED |

The fabric may allow for a high degree of control of the designs that may be displayed by the fabric. This may be achieved by manipulating and controlling the different coloured threads used in the circular knitting process used to produce the fabric. The results are designs that are more wear resistant, durable and alive than designs that are printed onto fabric. Furthermore, the fabric itself may also have improved durability and strength when compared with currently available woven fabric, thereby allowing its use a cover material for the chair.

Figure 8:
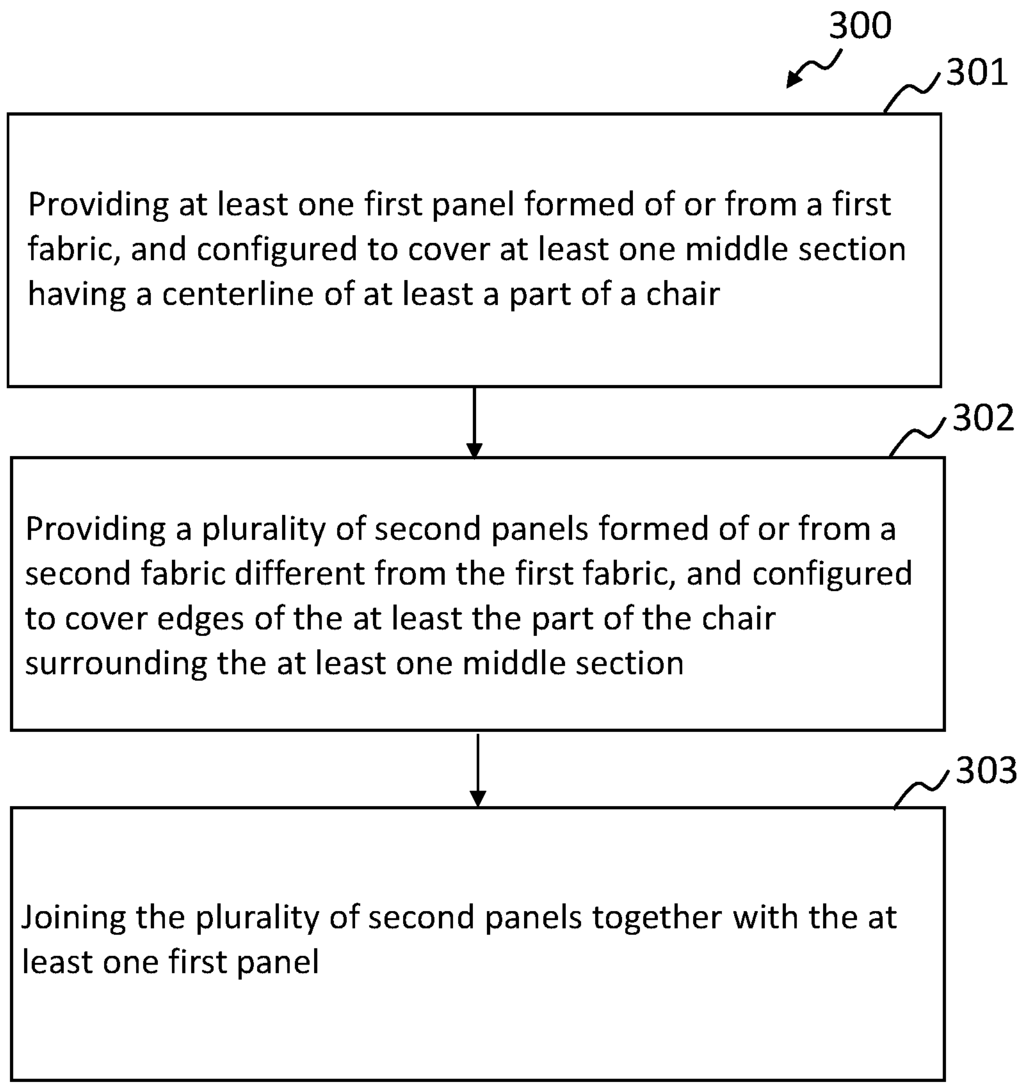
FIG. 8 shows a flow diagram illustrating a method of manufacturing a chair cover according to various embodiments.

FIG. 8 shows a flow diagram illustrating a method 300 of manufacturing a chair cover for covering at least a part of a chair according to various embodiments.

As shown in FIG. 8, in some embodiments, the method 300 may include a step 301 of providing at least one first panel formed of or from a first fabric, and configured to cover at least one middle section having a centreline of the at least the part of the chair. For example, the first fabric may be patterned and cut to provide the at least one first panel.

In some embodiments, the method 300 may include a step 302 of providing a plurality of second panels formed of or from a second fabric different from the first fabric, and configured to cover edges of the at least the part of the chair surrounding the at least one middle section. For example, the second fabric may be patterned and cut to provide the plurality of second panels.

In some embodiments, the method 300 may include a step 303 of joining the plurality of second panels together with the at least one first panel. For example, the at least one first panel and the plurality of second panels may be joined by seams and then stitched.

In some embodiments, the plurality of second panels may be configured to be stretched more than the at least one first panel such that the chair cover fits snugly around the edges of the at least the part of the chair.

In some embodiments, the method 300 of manufacturing the chair cover may refer to the chair cover described with reference to FIGS. 1 to 7 and repeated descriptions will be omitted.

In some embodiments, a furniture cover for covering at least a part of a furniture may be provided. In some embodiments, the “furniture” refers broadly to an object kept in any space (for example, an interior or an exterior of a house or a building) for use or occupancy. Examples of the furniture may include, but are not limited to, a chair, a table, a desk, a bed, a cabinet, a dresser and a cupboard.

In some embodiments, the furniture cover may comprise a plurality of panels. The plurality of panels may comprise at least one first panel and a plurality of second panels. The at least one first panel may be formed of or from a first fabric, and configured to cover at least one middle section having a centreline of the at least the part of the furniture. The plurality of second panels may be formed of or from a second fabric different from the first fabric, and joined together with the at least one first panel. The plurality of second panels may be configured to cover edges of the at least the part of the furniture surrounding the at least one middle section. The plurality of second panels may be configured to be stretched more than the at least one first panel such that the furniture cover fits snugly around the edges of the at least the part of the furniture.

It may be appreciated that the descriptions of the chair cover described with reference to FIGS. 1 to 8 may be applied to the furniture cover.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

The invention claimed is:

1. A chair cover for covering at least a part of a chair, the chair cover comprising a plurality of panels comprising:

at least one first panel formed of or from a first fabric, and configured to cover at least a front middle section having a centreline of the at least the part of the chair;

a plurality of second panels formed of or from a second fabric different from the first fabric and joined together with the at least one first panel, wherein the plurality of second panels are configured to cover front edge sections, side sections and rear edge sections of the at least the part of the chair surrounding the front middle section, wherein the plurality of second panels are configured to be stretched more than the at least one first panel such that the chair cover fits snugly around the edges of the at least the part of the chair, and at least one fastener disposed along an interface between two adjacent abutting panels of the plurality of second panels and configured to releasably couple the two adjacent abutting panels, wherein the second fabric has a lateral elasticity and a longitudinal elasticity that are different from each other and/or the lateral elasticity is greater than the longitudinal elasticity.

2. The chair cover according to claim 1, wherein the first fabric has a first elasticity and the second fabric has a second elasticity, and the first elasticity is less than the second elasticity.

3. The chair cover according to claim 1, wherein the first fabric does not have an elasticity.

4. The chair cover according to claim 1, wherein the first fabric has a first thickness and the second fabric has a second thickness, and the first thickness is less than the second thickness.

5. The chair cover according to claim 1, wherein the first fabric has a first grammage and the second fabric has a second grammage, and the first grammage is greater than the second grammage.

6. The chair cover according to claim 1, wherein the at least one fastener includes at least one of a zipper, a band, a buckle, a snap button, a clip, and any combination thereof.

7. The chair cover according to claim 1, wherein the plurality of second panels that are adjacent and abutting the at least one first panel are permanently joined together.

8. The chair cover according to claim 1, wherein at least one of the first fabric and the second fabric comprise circular knit fabric, and the at least one of the first fabric and the second fabric displays a design.

9. The chair cover according to claim 8, wherein the design comprises a ratio of different coloured threads.

10. The chair cover according to claim 1, wherein the chair cover includes a backrest cover for covering a backrest of the chair, wherein the at least one first panel comprises a front backrest panel and a rear backrest panel configured to cover a front middle section having a front centreline and a rear middle section having a rear centreline of the backrest of the chair respectively.

11. The chair cover according to claim 10, wherein the plurality of second panels are configured to cover front edge sections, side sections and rear edge sections of the backrest of the chair and comprise a first front wing panel and a second front wing backrest panel, a first rear wing backrest panel and a second rear wing backrest panel, a top backrest panel, and a first side backrest panel and a second side backrest panel, wherein each of the first and second front wing backrest panels is disposed on each side edge of the front backrest panel, each of the first and second rear wing backrest panels is disposed on each side edge of the rear backrest panel, the top backrest panel is disposed between the front backrest panel and the rear backrest panel, the first side backrest panel is disposed between the first front wing backrest panel and the second rear wing backrest panel, and the second side backrest panel is disposed between the second front wing backrest panel and the first rear wing backrest panel.

12. The chair cover according to claim 11, wherein the at least one fastener comprises a first fastener and a second fastener, and wherein the first fastener is disposed along an abutting interface between the rear backrest panel and the first rear wing backrest panel and configured to releasably couple the rear backrest panel and the first rear wing backrest panel, and the second fastener is disposed along an abutting interface between the rear backrest panel and the second rear wing backrest panel and configured to releasably couple the rear backrest panel and the second rear wing backrest panel.

13. The chair cover according to claim 11, wherein the at least one fastener comprises a third fastener, and wherein the third fastener is disposed along an abutting interface between the front backrest panel and the rear backrest panel and configured to releasably couple the front backrest panel and the rear backrest panel.

14. The chair cover according to claim 11, wherein the front backrest panel comprises at least one inelastic loop configured to be pulled such that the front backrest panel is straightened.

15. The chair cover according to claim 11, wherein at least one of the first and second rear wing backrest panels comprises a hole, to allow a protruding member of the backrest of the chair to be penetrated therethrough.

16. The chair cover according to claim 15, wherein the at least one of the first and second rear wing backrest panels further comprises a ring covering an edge of the hole, to prevent the at least one of the first and second rear wing backrest panels from being overstretched when the protruding member is penetrated through the hole.

17. The chair cover according to claim 1, wherein the chair cover includes a seat base cover for covering a seat base of the chair, wherein the at least one first panel comprises a top seat base panel configured to cover a middle section having a centreline of the seat base of the chair.

18. A chair cover for covering a chair, the chair cover comprising:

a backrest cover for covering a backrest of the chair comprising:

a front backrest panel and a rear backrest panel formed of or from a first fabric, and configured to cover a front middle section having a front centreline and to cover a rear middle section having a rear centreline of the backrest of the chair respectively;

a plurality of second backrest panels formed of or from a second fabric different from the first fabric, joined together with at least one of the front backrest panel and the rear backrest panel, and configured to cover front edge sections, side sections and rear edge sections of the backrest of the chair surrounding the front middle section and the rear middle section; and at least one fastener disposed along an interface between two adjacent abutting panels of the plurality of second backrest panels and configured to releasably couple the two adjacent panels; and a seat base cover for covering a seat base of the chair comprising:

a top seat base panel formed of or from a third fabric, and configured to cover a middle section having a centreline of the seat base of the chair, and a plurality of second seat base panels formed of or from a fourth fabric different from the third fabric, joined together with the top seat base panel, and configured to cover edge sections and side sections of the seat base of the chair surrounding the middle section, wherein the plurality of second backrest panels are configured to be stretched more than the front backrest panel and the rear backrest panel such that the backrest cover fits snugly around the edges of the backrest of the chair, and the plurality of second seat base panels are configured to be stretched more than the top seat base panel such that the seat base cover fits snugly around the edges of the seat base of the chair, wherein the second fabric has a lateral elasticity and a longitudinal elasticity that are different from each other and/or the lateral elasticity is greater than the longitudinal elasticity.

19. A method of manufacturing a chair cover for covering at least a part of a chair comprising steps of:

providing at least one first panel formed of or from a first fabric, and configured to cover at least a front middle section having a centreline of the at least the part of the chair;

providing a plurality of second panels formed of or from a second fabric different from the first fabric, and configured to cover front edge sections, side sections and rear edge sections of the at least the part of the chair surrounding the front middle section;

joining the plurality of second panels together with the at least one first panel; and providing at least one fastener disposed along an interface between two adjacent abutting panels of the plurality of second panels, the at least one fastener configured to releasably couple the two adjacent panels, wherein the plurality of second panels are configured to be stretched more than the at least one first panel such that the chair cover fits snugly around the edges of the at least the part of the chair, and wherein the second fabric has a lateral elasticity and a longitudinal elasticity that are different from each other and/or the lateral elasticity is greater than the longitudinal elasticity.

* * * * *